MEMORY SYSTEM WITH DEFECTIVE STORAGE LOCATIONS

Filed April 19, 1968 4 Sheets-Sheet 1

| $b_1$ | $b_0$ | b |
|---|---|---|
| 1 | 0 | +1 |
| 0 | 1 | -1 |
| 0 | 0 | 0 |
| 1 | 1 | N.P. |

| S | $d_1$ | $d_0$ |
|---|---|---|
| +1 | 1 | 0 |
| -1 | 0 | 1 |
| 0 | 1 | 1 |
| N.P. | 0 | 0 |

INVENTOR
Robert A. Gange
BY [signature]
ATTORNEY

INVENTOR
Robert A. Gange
BY Samuel Cohen
ATTORNEY

MEMORY SYSTEM WITH DEFECTIVE STORAGE LOCATIONS

Filed April 19, 1968

INVENTOR
Robert A. Gange
BY [signature]
ATTORNEY

MEMORY SYSTEM WITH DEFECTIVE STORAGE LOCATIONS

Filed April 19, 1968

INVENTOR
Robert A. Gange
BY
ATTORNEY

United States Patent Office 3,541,525
Patented Nov. 17, 1970

3,541,525
MEMORY SYSTEM WITH DEFECTIVE STORAGE LOCATIONS

Robert A. Gange, Belle Mead, N.J., assignor to RCA Corporation, a corporation of Delaware Filed Apr. 19, 1968, Ser. No. 722,661
Int. Cl. G11c *11/44*
U.S. Cl. 340—172.5 4 Claims

ABSTRACT OF THE DISCLOSURE

Use is made of the ternary storage properties of a memory such as a superconductor memory to permit the use of a less than perfect memory. Two of the memory states correspond to storage of the binary digits 1 and 0, respectively. The defective memory elements are maintained always in their third memory state. When an effort is made to address a defective memory element, the read or write currents automatically are effectively diverted from the defective element and directed instead to a substitute good memory element in response to the third state condition of the defective element.

BACKGROUND OF THE INVENTION

In the manufacture by batch fabrication techniques of very large numbers of memory elements at the same time, it is very difficult and sometimes impossible to obtain 100% yields. However, the memory user, for reasons of programming efficiency demands a memory with all good storage locations or at least one which appears to the programmer to have all good storage locations. The object of this invention is to provide a memory arrangement which does appear to the user to have all good storage locations, even though the memory may, in fact, have some memory locations which are defective.

SUMMARY OF THE INVENTION

In the memory of the invention, a small group of spare or redundant memory elements is provided for a relatively large group of memory elements in the array. In response to the sensing of a memory element in a state other than that corresponding to storage of the binary digits 1 and 0, respectively, the read or write signals are effectively diverted from the defective memory element to one of the spare memory elements.

DETAILED DESCRIPTION

Figure 2:
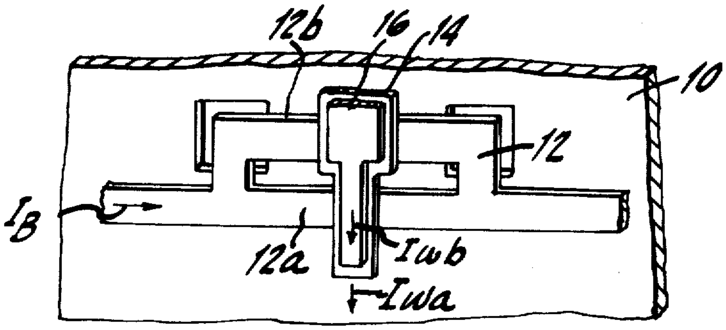
FIG. 2 is a perspective view of a superconductor memory cell which may be employed in the memory of the invention.

The memory elements of the present invention may be cryoelectric memory elements such as shown in FIG. 2. As will be explained later in connection with this figure, each such element can assume any one of three different states. In one state, representing storage of the bit 1, a persistent current circulates around the loop in one direction; in a second state, representing storage of the bit 0, persistent current circulates around the loop in the other direction; in its third state, no persistent current is present in the memory element.

Figure 1A:
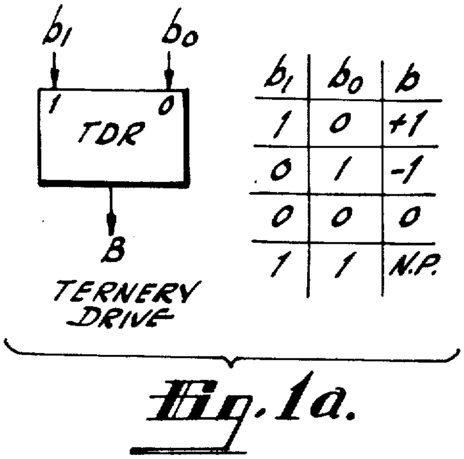
FIGS. 1*a*–1*d* are drawings of conventions employed in other of the figures.

A number of the logic elements of the system of the invention are also ternary elements. For example, ternary drivers such as shown in FIG. 1*a* are employed. The convention arbitrarily is adopted that one ternary condition of the driver, legended +1 in the truth table, is represented by a positive-going output pulse. This condition occurs in response to the binary inputs $b_1=1$, $b_0=0$. A second ternary condition of the driver, legended −1, is represented by a negative-going output pulse. This condition occurs in response to the binary inputs $b_1=0$, $b_0=1$. The third ternary condition of the driver, legended 0, is manifested by the absence of a pulse. This condition occurs in response to the binary inputs $b_1=0$, $b_0=0$. In the fourth row of the table, the legend N.P. means that this condition is not possible.

The convention arbitrarily adopted is that a binary 1 is represented by a relatively negative signal −V and a binary 0 by a relatively positive signal, such as ground. To simplify the discussion which follows, sometimes the binary digit or bit itself is referred to rather than the signal manifesting the bit.

Figure 1B:
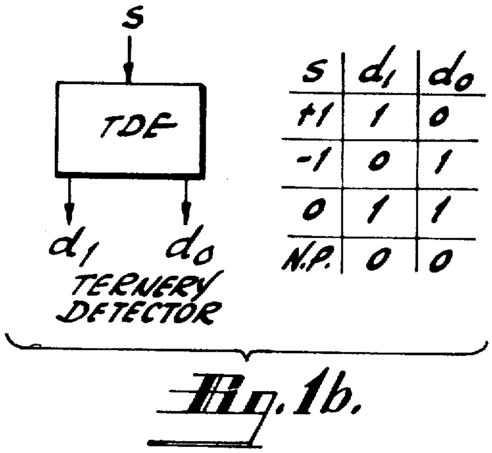

The operation of the ternary detector, shown in FIG. 1*b*, is believed to be self-evident from the explanations already given. Actual circuits for the ternary driver and ternary detector will be given later, by way of example.

Figure 1C:
Figure 1D:
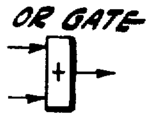

The circuits of the present invention also include binary logic elements, such as AND and OR gates. An AND gate, shown in FIG. 1*c*, produces an output representing the bit 1 only when all of its input signals represent the bit 1. An OR gate, shown in FIG. 1*d*, produces an output representing the bit 1 when one or more of its inputs represent the bit 1. The memory discussed by way of example in this application is a superconductor memory. It operates at a temperature of several degrees Kelvin which may be obtained by immersing the memory in a liquid helium bath. Such an environment is assumed in the discussion which follows.

The superconductor memory element of FIG. 2 comprises a lead ground plane 10, a loop 12 formed of tin and two lead drive lines 14 and 16, respectively. These metal layers are insulated from one another by an insulator such as by silicon monoxide; however, in the interest of simplifying the drawings, the insulation is not shown.

In the operation of the memory element of FIG. 2, a current $I_B$ is applied to the conductor containing the loop 12. Both paths **12*a* and 12*b* of the loop are superconducting and since path 12*a* exhibits a substantially lower inductance than path 12*b*, the current $I_B$ flows substantially entirely into path 12*a*. If now drive currents $I_{Wa}$ and $I_{Wb}$ are applied to the lines 14 and 16, respectively, during the time the current $I_B$ is present, the path 12*a* will be driven to the normal state and the path 12*b* will remain superconducting. Note that the lines are not as wide in the region where they pass over path 12*a* as where they pass over the path 12*b* and therefore, the magnetic field intensity can be made sufficient to drive the path 12*a* normal while the path 12*b*** remains superconducting.

When the path **12*a* is driven normal, the current $I_B$ steers into the path 12*b*. If now the drive currents $I_{Wa}$ and $I_{Wb}$ are removed while the current $I_B$ is still present, the flux due to the current $I_B$ will be trapped in the loop 12 due to the return to the superconducting state of path 12*a*. Subsequently, when the current $I_B$ is removed, the trapped flux cannot escape and a persistent current remains circulating around the loop 12**. This persistent current represents storage of a binary digit of one value, such as a 1.

If the write procedure above is repeated but the direction of the current $I_B$ is reversed, then a persistent current will be established in the loop 12 which circulates in the direction opposite to that discussed above. The presence of this persistent current circulating in the opposite direction represents storage of the binary digit of the other value, such as binary 0.

There is also a third state possible for the memory of FIG. 2. In this state, no persistent current flows around the storage loop. This state would occur, for example, if, during removal of the drive currents $I_{Wa}$ and $I_{Wb}$, the current $I_B$ were not applied to the loop. It would also occur if a certain type of defect were present in the loop 12. For example, if either the path 12*a* or 12*b* were open, a persistent current could never be established in the loop 12.

To read information from the memory element of FIG. 2, the word currents $I_{Wa}$ and $I_{Wb}$, which may be termed "read" currents during this portion of the operation cycle, are applied concurrently in the absence of the bit current $I_B$. If persistent current is present in loop 12, then in response to these read currents, the persistent current will decay to zero across the resistance introduced by the normal state of path 12*a*, and a voltage will develop across the conductor (known as the bit line) of which the loop 12 is a part. The polarity of the sense voltage will depend upon the direction in which the persistent current was flowing before it was made to die out. For purposes of the present discussion, the convention arbitrarily is adopted that a positive read pulse represents ternary 1, that is, storage of binary 1 and a negative read pulse represents ternary −1, that is, storage of binary 0. Pulses of these polarities readily are obtained by appropriate coupling of the ternary detector to the bit line conductor as, for example, by transformer (this may be within block 100 of FIG. 6 but is not shown separately). If no persistent current is present in the loop at the time the currents $I_{Wa}$ and $I_{Wb}$ are applied, then no sense voltage is produced at the output terminals of the conductor. This condition corresponds to ternary 0.

Figure 3:
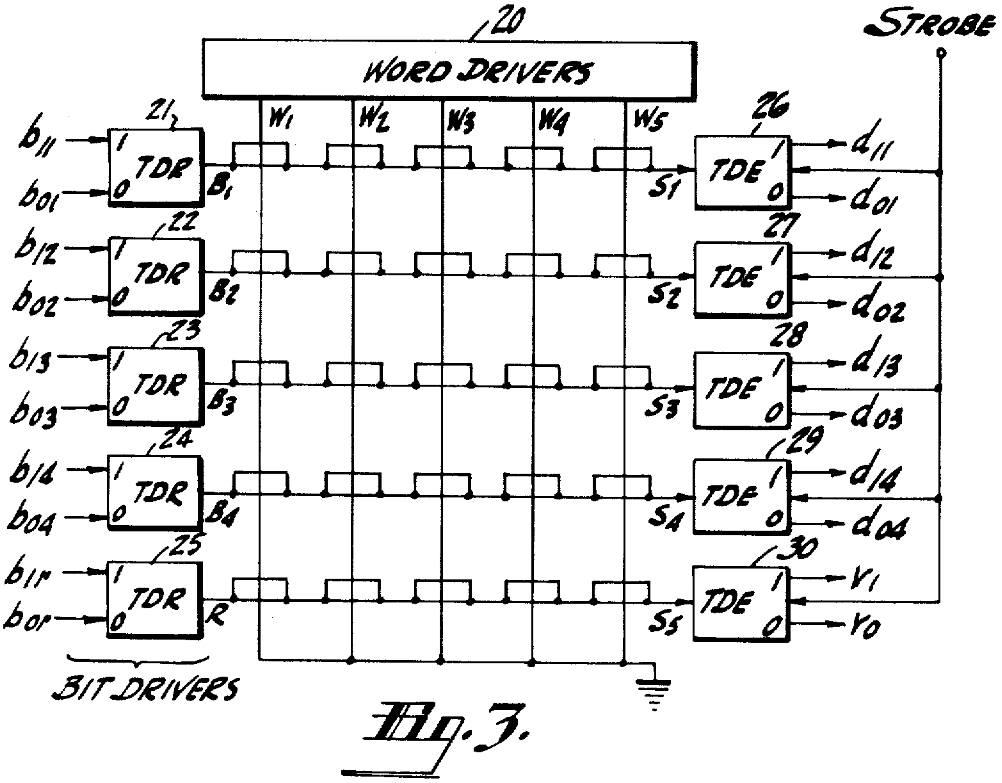
FIG. 3 is an array of memory elements, some of which may be defective.

A memory employing the memory element of FIG. 2 is shown in FIG. 3. For the sake of drawing simplicity, rather than employing two drive lines for each memory element, only a single such line is shown in FIG. 3. As a matter of fact, the memory will work in word-organized fashion with only a single such line. However, in operation, it is preferred that the memory be organized with two word lines per memory location as, for example, is discussed in the article, by the present inventor, entitled "Taking Cryoelectric Memories Out of Cold Storage," Electronics, Apr. 7, 1967, pp. 111–120.

The memory of FIG. 3 is shown to have five word lines $W_1$ through $W_5$ and five bit or digit lines $B_1$ through $B_4$ and R. In practice the memory may be much larger than this both in the word and bit dimensions. The last line R is a spare or redundant line and its cells are used only in the case that there is a defective memory cell in the corresponding word line. For example, if memory cell at $W_1B_2$ is defective, then during the operation of the memory rather than using that cell, the circuits to be discussed automatically substitute the cell at $W_1R$. It is assumed that no more than one defective cell location in five (in his example) exists along any given word line.

The word lines are operated by word drivers illustrated as a single block 20. The bit lines are driven by a plurality of ternary drivers 21–25 shown connected to the respective bit lines. A plurality of ternary detectors 26–30 are also connected to the respective bit lines.

Figure 4:
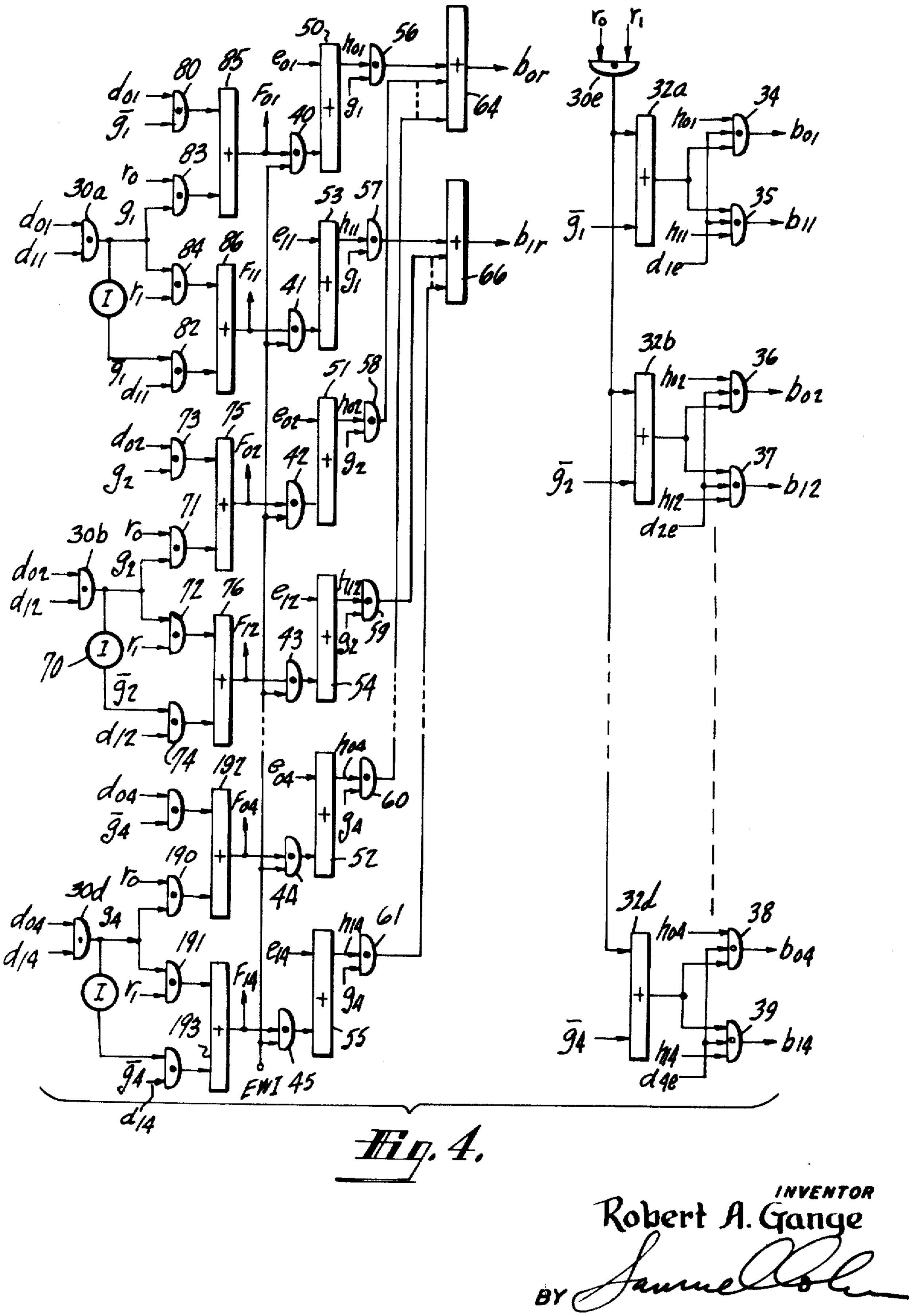
FIG. 4 is a logic circuit diagram associated with the memory of FIG. 3.

The logic associated with the memory of FIG. 3 is shown in FIG. 4. It consists of groups of AND and OR gates interconnected as shown, whose purpose, in addition to the regeneration of the destructively read information is to sense for the presence of a bad memory location and, in response to this condition, to substitute for this bad location a good memory location located along the R bit line at the same address.

In the operation of the memory system of the invention, to start with the memory is tested in routine fashion by applying various bit patterns to the memory. During the testing, a record is made as, for example, on a paper tape, of the defective memory locations. Then when the memory is delivered to the user, a standard pattern is written into each memory location except the defective locations. For example, the binary digit 0 corresponding to, say circulation of a persistent current in a given direction, may be written into each good memory location including each spare or R cell location. At the same time, a defective memory location is not written into at all, that is, it is maintained in its third memory state.

The way the above may be done is as follows. To start with, assume that it is desired to operate on column 1 (line $W_1$) of the memory. The memory of the present invention is always operated in write after read fashion. Therefore, first a read current $I_{W1}$ is applied in the absence of currents B. Initially, none of the memory locations in column 1 of the memory is storing a bit of any kind. Therefore, no sense signals are produced along any of the five rows of the memory so that $S_1$ through $S_5$ represent ternary 0. Therefore, each ternary detector 26–30 will produce an output 1,1 (see FIG. 1*b*).

The 1,1 outputs of the detectors 26–29 are applied to the four AND gates 30*a*–30*d* of FIG. 4. To simplify the drawing, only three of these gates 30*a*, 30*b* and 30*d* are shown in FIG. 4, the remaining gate and the logic elements associated with this gate are indicated schematically in FIG. 4 by dashes. The outputs $r_0$, $r_1$ of the last ternary detector 30 are applied to AND gate 30*e* at the upper right. AND gates 30*a*–30*e* therefore all become enabled and AND gate 30*e* supplies a 1 to OR gates 32*a* through 32*d*. This 1 serves as a priming signal for AND gates 34, 35, 36, 37 . . . 38 and 39.

As all of the *d* signals represent 1's, all of AND gates 30 are enabled and all of the *g* signals also represent 1. The signals $r_0$ and $r_1$ also represent 1. Therefore, AND gates 83, 84, 71, 72 . . . 190 and 191 are all enabled. Therefore, all of the OR gates 85, 86, 75, 76 . . . 192 and 193 are enabled. Therefore, all of the F signals, $F_{01}$, $F_{11}$, $F_{02}$ and so on all represent 1. These F signals are the read signal outputs of the memory. However, they are meaningless at present since no information has yet been stored in the memory. After information is stored in the memory, the pairs of F signals will represent complementary binary quantities. For example, if $F_{01}$ represents a 0, $F_{11}$ will represent a 1. When $F_{11}=1$ and $F_{01}=0$, this means that the memory location read out is in the ternary +1 state and is indicative of the storage of binary 1. If the reverse is the case, this means that the memory location read out is in the ternary −1 state and is indicative of the storage of binary 0.

Assume now that locations $W_1B_1$, $W_1B_2$ . . . $W_1B_4$ and $W_1R$ are all good locations. In this case, when writing the standard pattern into the memory, a 0 will be written into these five locations. To do this, the external write signals $e_{01}$, $e_{02}$ . . . $e_{04}$ all are made to represent the bit 1 and the external write signals $e_{11}$, $e_{12}$ . . . $e_{14}$ are all made to represent the bit 0. At the same time, the external write inhibit signal (EWI) is changed in value to 0 so that AND gates 40, 41, 42, 43 . . . 44 and 45 are all disabled. As $e_{01}$, $e_{02}$ . . . $e_{04}$ all equal 1, OR gates 50, 51 . . . 52 are enabled and as the inputs to the remaining OR gates 53, 54 . . . 55 are all 0, these gates are disabled. The outputs of AND gates 30*a* through 30*d* are all 1 so that the *g* inputs to AND gates 56, 57, 58, 59 . . . 60 and 61 are all 1. Of these gates, those receiving an *h* signal equal to 1, that is, AND gates 56, 58 . . . and 60 are all enabled so that OR gate 64 is enabled and $b_{or}$ equals 1.

At the right side of the figure, as all of the storage locations are good locations, $d_{1e}$, $d_{2e}$ . . . $d_{4e}$, which are externally applied signals, are all made to represent the bit 1. The other input to each gate, namely the respective outputs of the OR gates 32, is also a 1 due to AND gate 30*e* being enabled; $h_{01}$, $h_{02}$ . . . $h_{04}$ are also 1. Therefore $b_{01}$, $b_{02}$ . . . $b_{04}$ are all 1, whereas AND gates 35, 37 and 39 are disabled due to $h_{11}$, $h_{12}$ . . . $h_{14}$ being 0 so that $b_{11}$, $b_{12}$ . . . $b_{14}$ are all 0.

The various *b* signals just discussed are applied to the ternary drivers 21 through 25, respectively, as shown in FIG. 3. This causes each driver to produce an output representing the ternary digit −1, as illustrated in FIG. 1*a*, that is, a negative pulse. This produces a current flow in the correct direction along the various bit lines to cause a 0 initially to be written at all locations along word line $W_1$. In other words, a circulating persistent current is established in each loop $W_1B_1$, $W_1B_2$ . . . $W_1B_4$, $W_1R$, in response to the negative pulse produced by drivers 21–25 and the current $I_{W1}$ flowing in the word line $W_1$. This persistent current, when read out during a subsequent read cycle, will be manifested as a negative S pulse, indicative of the ternary quantity −1 which, in turn, is indicative of storage of the binary digit 0.

If all of the memory locations shown are good locations, the same procedure as discussed above is followed for each word line until all 25 memory locations shown store the binary digit 0.

Suppose now that a defective location such as $W_1B_2$ is present along word line $W_1$. In this case, when the standard pattern initially is being written into the memory, the $d_{2e}$ signal (FIG. 4) is made to represent the bit 0 so that AND gates 36 and 37 are inhibited. This means that during the immediately following write operation, $b_{02}$ and $b_{12}$ both will have the value 0 and the ternary driver 22 will apply a ternary 0, that is, no current pulse at all, to the bit line $B_2$. Therefore, the ternary quantity 0 will be written into bit location $W_1B_2$, that is, no persistent current will be stored at that location.

In all other respects, the initial write in operation is the same. Each good memory location will have a persistent current stored indicative of the bit 0 and each defective memory location will have no persistent current stored.

Assume now that the same conditions as above prevail and that it is desired to read word 1 (the word stored along line $W_1$) and then to rewrite this word back into the same memory location. During the read operation, $S_1$, $S_3$, $S_4$ and $S_5$ will appear as negative pulses (ternary −1) but $S_2$ will appear to be a ternary 0. Therefore, $d_{11}$, $d_{13}$, $d_{14}$ and $r_1$ will be binary 0; $d_{01}$, $d_{03}$, $d_{04}$ and $r_0$ will be binary 1 and $d_{12}$ and $d_{02}$ will both be binary 1 (see FIG. 1*b*).

The $d_{02}$, $d_{12}$ signals are applied to AND gate 30*b* and since both signals represent binary 1, $g_2=1$ and $\bar{g}_2=0$. Note that $\bar{g}_2$ is produced by inverter 70. AND gates 71 and 72 are therefore primed and AND gates 73 and 74 are disabled. The output of the ternary detector for the redundant bit line is $r_0=1$ and $r_1=0$. Therefore, AND gate 71 becomes enabled and AND gate 72 is disabled. OR gate 75 therefore is enabled and OR gate 76 is disabled. Therefore, the read output signal $F_{02}$ represents a 1 and $F_{12}$ represents a 0. The $F_{02}$ and $F_{12}$ signals are associated with the bit line $B_2$ so that even though there is a defective memory location $W_1B_2$, it appears to the outside world that binary 0 was stored in this defective location.

At the remaining storage locations, the correct signals also will be read out. For example, memory location $B_1W_1$ is a good location. During read out, AND gate 30*a* is disabled so that $\bar{g}_1=0$ and $g_1=1$. Also $d_{01}={}_1$ and $d_{11}=0$. Therefore, AND gate 80 is enabled and AND gates 82, 83 and 84 are disabled. Therefore OR gate 85 is enabled, whereas OR gate 86 is disabled. $F_{01}$ therefore represents a 1 and $F_{11}$ a 0. Again, these are the outputs associated with bit line $B_1$ and they indicate that memory location $W_1B_1$ is storing binary 0.

Suppose now that it is desired automatically to write (to regenerate) the same information read out of the memory back into the memory. In this case, the external write inhibit signal EWI is made to represent a 1 (its normal value) and the various *e* signals $e_{01}$, $e_{11}$, $e_{02}$, $e_{12}$ and so on, are all made to represent 0. AND gate 40 is enabled as $F_{01}$ represents a 1. Therefore, $h_{01}$ is a 1 but $g_1$ is a 0 so that AND gate 56 is disabled. The only *g* which represents a 1 is $g_2$. This primes AND gates 58 and 59. As $F_{02}$ represents a 1, AND gate 42 is enabled as is OR gate 51, and $h_{02}$ represents a 1. However, OR gate 54 is disabled because $F_{12}$ is a 0 so that $h_{12}$ represents a 0. Therefore OR gate 64 becomes enabled and OR gate 66 is disabled. The $b_{0r}=1$ and $b_{1r}=0$ signals produced respectively by OR gates 64 and 66 are applied to the ternary driver 25 (FIG. 3) for the redundant line R. Therefore, the bit binary 0 is written into storage location $W_1R$.

The signal $\bar{g}_1=1$. The signals $h_{01}$ and $d_{1e}$ also are equal to 1. Therefore, OR gate 32*a* and AND gate 34 are enabled, whereas AND gate 35 is disabled due to $h_{11}$ being 0. The outputs $b_{01}=1$, $b_{11}=0$ are applied to ternary driver 21 and this causes the bit 0 to be rewritten into storage location $W_1B_1$ again. The same type of operation occurs for all other good storage locations.

The signal $\bar{g}_2=0$. The output of AND gate 30*e* is also equal to 0 as $r_1=0$. Therefore, OR gate 32*b* is disabled as are AND gates 36 and 37. Therefore, $b_{02}=0$ and $b_{12}=0$. In response to these two inputs, the ternary driver 22 for bit line $B_2$ applies a ternary 0 (no signal) to bit line $B_2$ so that the condition of storage location $W_1B_2$ is perpetuated, that is, this location continues to store nothing (ternary 0) with the cell location $W_1R$ acting as a substitute for the defective location.

The operation of the circuit of FIG. 4 is somewhat similar to that described already when it is desired to write new information into the memory location. Again, let it be assumed that the programmer is attempting to write a 1 into the defective cell location $W_1B_2$. It has already been shown that during the read operation, $F_{02}=1$ and $F_{12}=0$. When it is desired to write new information into the memory, the signal EWI changes to 0. This disables AND gates 42 and 43. However, the external write commands are $e_{12}=1$ and $e_{02}=0$ indicating that a 1 is to be written into location $W_1B_2$ so that $h_{12}=1$. As $d_{02}$ and $d_{12}$ are both 1, $g_2$ is also equal to 1 so that AND gate 59 becomes enabled, whereas since $h_{02}$ is 0, AND gate 58 remains disabled. Therefore, OR gates 64 and 66 produce outputs $b_{0r}=0$ and $b_{1r}=1$, respectively. Note that AND gates 56, 57 . . . 60, 61 are disabled due to $g_1$ . . . $g_4$ all=0. The $b_{0r}=0$ and $b_{1r}=1$ outputs are applied to ternary driver 25 (FIG. 3) for the redundant line R and this driver applies a positive-going pulse indicative of ternary +1 to the line R. In response to this pulse and the word current $I_{W1}$, a binary 1 is written into storage location $W_1R$.

Summarizing the operation discussed above, if there is a defective memory location in the memory, the logic circuits of FIG. 4 substitute for that location a good location along the redundant line R. During the read operation, even though the programmer is attempting to read a defective location, he will read automatically instead the contents of the corresponding redundant location. Similarly, during the write operation, even though the programmer is attempting to write information into a bad location, he will automatically write it instead into the redundant location along the same word line.

One apparent limitation of the present invention is that with only a single redundant line, only one defective bit location in a word can be compensated for. However, the memory can be subdivided into blocks the sizes of which will depend upon the quality of the manufacturing process. It can be determined, on a statistical basis, how many bits will be defective along the word line and a number of redundant lines can then be selected which will be sufficient to correct all of the errors expected. It should also be pointed out that the designation of a particular line as a redundant line is perfectly arbitrary. Any one of the lines can be so designated.

The system described above automatically will correct for most of the defects in a memory plane. However, it sometimes occurs in bit-organized memories (memories with two word lines such as 14 and 16 of FIG. 2 at each storage location) that even though it is attempted to maintain a storage location in the ternary 0 state, that is, in a state in which no persistent current is stored, when that memory location is read out, a sense signal will be produced. This may occur, for example, when there is a nick in the word line at a memory location so that the word current drives that portion of the line normal during a "half-select" cycle thereby causing at a later read operation a voltage pulse to be produced.

Figure 5:
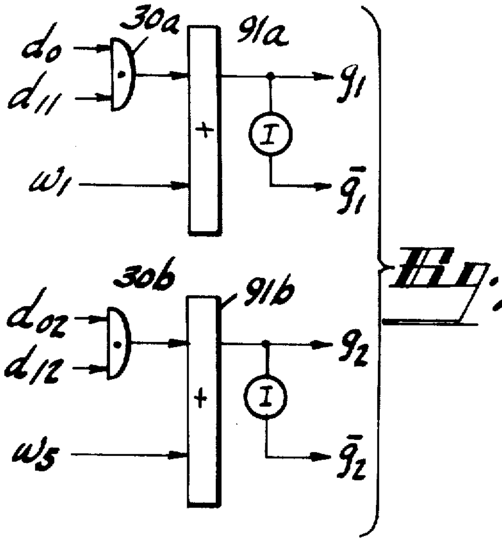
FIG. 5 is a circuit diagram of a portion of a modified form of a circuit such as shown in FIG. 4.

The modified circuit, shown in part in FIG. 5, will compensate for this type of defect. In this circuit, the $g$ signals are produced at OR gates 91*a*, 91*b* . . . 91*d* (only the first two of these gates are shown) rather than at AND gates 30*a* . . . 30*d*. Each OR gate receives as one input an output of an AND gate 30. As its second input, it receives a signal $w$ derived from the coincident presence of word currents ($I_{Wa}$ and $I_{Wb}$ of FIG. 2), if there happens to be a storage location with this particular type of defect at the particular bit line-word lines, memory location corresponding to that portion of the logic network. FIG. 5 shows, for example, that bit location $B_1W_1$ is defective in the sense that even though no persistent current is present, a signal indicative of storage of binary 1 or 0 may be read out during the read cycle. Under these circumstances, whenever word line $W_1$ (which in this case represents two word lines carrying coincident currents) has a signal applied, a signal $w_1$ is applied to OR gate 91*a*. This causes an output signal $g_1=1$ to be produced and it is applied where shown in FIG. 4.

The second OR gate 91*b* shown in FIG. 5 receives an input $w_5$. This means that storage location $W_5B_2$ is defective in the sense described above. Each time the word current $I_{W5}$, (again this represents coincident currents $I_{W5a}$, $I_{W5b}$) is applied, a binary signal $w_5=1$ is applied to OR gate 91*b*, making $g_2=1$.

While the invention has been described in terms of a particular type of loop cell, it is to be appreciated that it is applicable to any type of loop cell. For example, it is applicable to the loop cell described in the article mentioned above and also to the so-called bridge cell described in Electronics, May 16, 1966 pp. 148, 149.

Figures 6, 7:
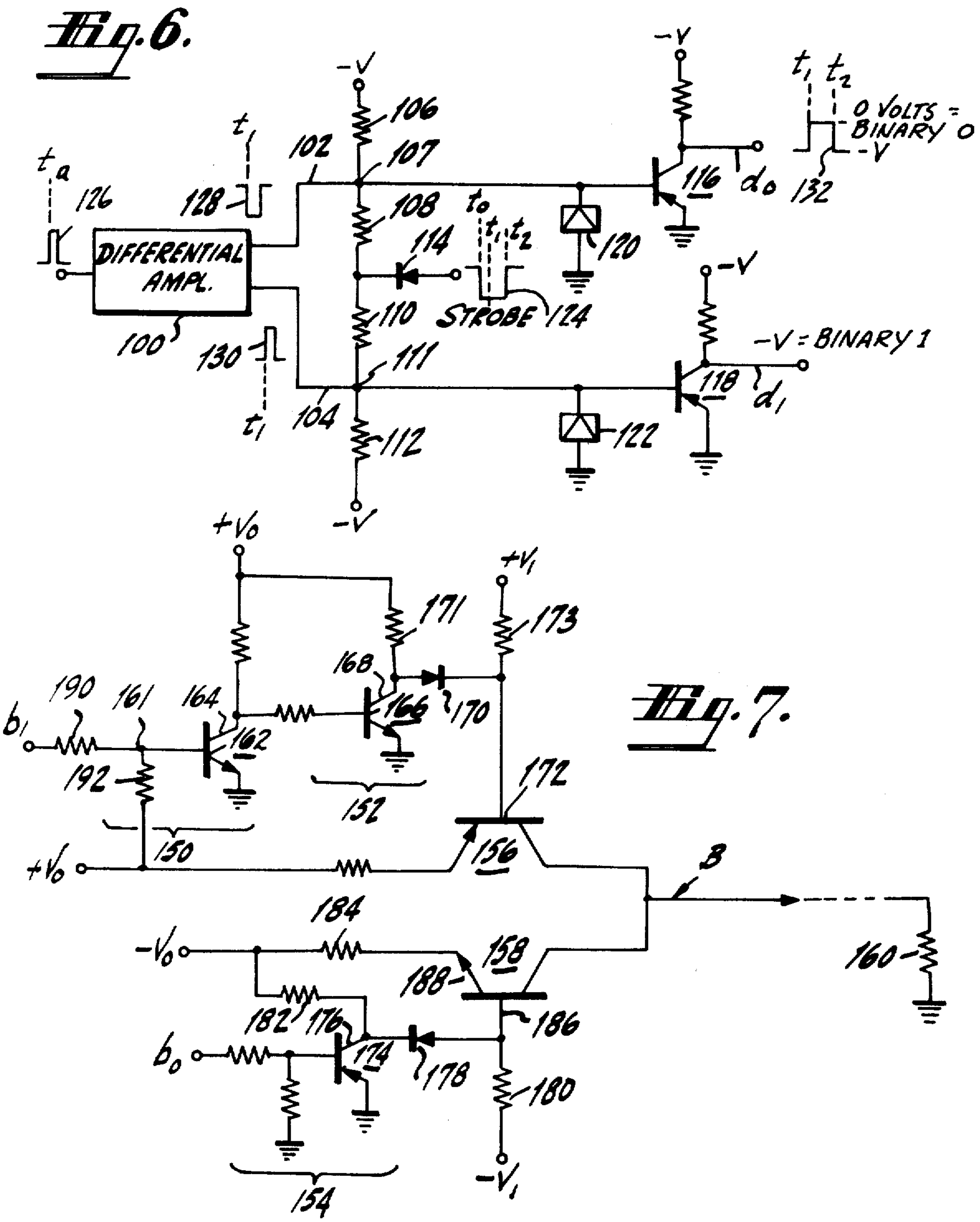
FIG. 6 is a block and schematic diagram of a ternary detector suitable for use with the memory of the present invention.
FIG. 7 is a circuit diagram of a form of ternary driver suitable for use in the memory system of the invention.

A ternary detector suitable for use in the present invention is shown in FIG. 6. It includes a differential amplifier 100 whose output lines 102 and 104 are connected at terminals 107 and 111, respectively, to the voltage divider 106, 108, 110, 112. The center point of the voltage divider is connected through diode 114 to a point in the strobe voltage circuit (not shown) which is normally relatively positive compared to the voltage source —V.

The points 107 and 111 of the voltage divider are connected to the bases of PNP transistors 116 and 118, respectively. Tunnel diodes 120 and 122 are connected with their cathodes to the bases of the transistors.

In the operation of the circuit of FIG. 6, in the absence of an input to the differential amplifier 100, representing a ternary 0 input to the circuit, the tunnel diodes are reverse biased and the transistors 116 and 118 are both cut off. The outputs $d_0$ and $d_1$ at the collectors of these transistors are therefore both at —V volts, representing the binary digit 1.

If a negative-going strobe voltage pulse 124 is applied to the diode 114, the voltage at terminals 107 and 111 becomes more negative to an extent sufficient slightly to forward bias tunnel diodes 120 and 122. These tunnel diodes now operate in the low voltage state close to their current peaks. However, the voltage across these tunnel diodes (typically less than 50 millivolts) is insufficient to drive either transistor 116 or 118 into conduction.

If during the time the strobe pulse 124 is present, a short duration positive-going voltage pulse 126, representing ternary +1 is applied to the differential amplifier, the latter produces output current pulses 128 and 130. The negative-going output pulse 128 applied to the cathode of tunnel diode 120 switches the tunnel diode to its high voltage state and transistor 116 is driven into heavy conduction. The transistor 116 thereupon produces a positive-going output pulse 132, indicative of the binary output $d_0=0$. The positive pulse 130 is in the reverse direction relative to tunnel diode 122. Accordingly, this tunnel diode becomes reverse biased and transistor 118 remains cut off. This transistor therefore continues to produce an output —V, indicative of the binary quantity $d_1=1$.

The output pulse 132 produced by transistor 116 starts at time $t_1$ which corresponds to the leading edge of the pulse 128 produced by the differential amplifier. The pulse 132 terminates when the tunnel diode 120 returns to its low voltage state. This occurs at the end of the strobe pulse 124 (time $t_2$).

When the input pulse to the differential amplifier 100 is relatively negative-going, the states of the tunnel diodes and of the transistors reverse. In response to such a negative pulse, the pulse 130 is negative-going and the pulse 128 is positive-going. Tunnel diode 122 is switched to the high voltage state and transistor 118 is driven into conduction. The output of transistor 118 now goes to ground so that $d_1=0$. The positive pulse at 128 reverse biases the tunnel diode 120 so that $d_0$ remains at —V representing binary 1.

A ternary driver suitable for use in the present invention is illustrated in FIG. 7. It comprises a level shifter transistor circuit 150, an inverter transistor circuit 152 and a second inverter transistor circuit 154. The output of inverter 152 is connected to the base of PNP driver transistor 156 through diode 170 and the output of inverter circuit 154 is connected to the base of NPN driver transistor 158 through diode 178. The collectors of transistors 156 and 158 are connected to a bit line, legended B, which is connected through an impedance, shown as resistor 160, which may be in the differential amplifier of FIG. 6, to ground.

In the operation of the circuit of FIG. 7, assume first that both inputs $b_0$ and $b_1$ are at ground, representing binary 0. In this case, through voltage divider action, the base 161 of transistor 162 becomes relatively positive and the transistor is driven into conduction. The collector 164 of the transistor therefore drops to substantially ground potential. Transistor 166 of the inverter 152 thereupon cuts off and the collector 168 of this transistor is at $+V_0$ volts. As $+V_0$ is more positive than $+V_1$, diode 170 conducts. The values of resistors 171 and 173 are so chosen that the base 172 assumes a voltage only slightly less positive then $+V_0$ volts. The voltage difference is insufficient to drive transistor 156 into conduction.

As $b_0$ is at ground, the transistor 174 of the inverter 154 is cut off and its collector 176 assumes a voltage of $-V_0$ volts. This is a more negative voltage than $-V_1$ so that diode 178 conducts. The values of resistors 180 and 182 are so chosen that the base 186 of transistor 158 is at a negative voltage which is only slightly more positive than $-V_0$, the difference being insufficient to drive transistor 158 into conduction. As both transistors 156 and 158 are effectively cut off, no current flows through these transistors and the bit line B is at ground.

Assume now that $b_1$ is —V volts, representing binary 1 and $b_0$ is at ground, representing binary 0. In this case, transistor 158 remains cut off as already described. The values of resistors 190 and 192 are so chosen that the base 161 of transistor 162 goes relatively negative. This transistor therefore is cut off and its collector 164 assumes a potential of $+V_0$ volts. Transistor 166 is thereupon driven into conduction and its collector goes to ground potential. Diode 170 is thereupon cut off. As the base 172 of transistor 156 is now at a positive voltage which is substantially less positive than $+V_0$ volts, transistor 156 is driven into heavy conduction, and a positive current pulse is applied to the bit line B. This corresponds to ternary +1, as shown in FIG. 1*a*.

If the signal $b_1$ is at ground and the signal $b_0$ is $-V$ volts, representing binary 1, transistor 156 is cut off. Transistor 174 is driven into conduction so that its collector 176 is at ground. Diode 178 therefore is cut off as the base 186 is at a negative voltage making the anode of diode 178 negative relative to its cathode. The voltage at base 186 is not as negative as the $-V_0$ volts coupled to the emitter 188 so that transistor 158 applies a "negative" current pulse to line B. This flow of current corresponds to ternary −1 of FIG. 1*a*.

What is claimed is:

1. In a memory a plurality of memory elements;

means for writing a binary 1 or a binary 0 into said elements comprising means for placing said elements in one or the other of two storage states; and means responsive to the indication produced by a storage element in a state other than said two storage states in response to a write signal applied to that storage element, for applying a write signal to a different storage element:

2. In a memory as set forth in claim 1, each memory element comprising a loop of superconductor material in which persistent current flowing in one direction is stored to represent storage of the binary digit 1, persistent current flowing in the opposite direction is stored to represent storage of the binary digit 0, and in which no persistent current is stored when said element is in a state other than the two states above.

3. In combination:

a memory having a plurality of storage elements, some of which may be defective, the good ones of said elements being capable of assuming first, second and third states and the defective ones of said elements being capable of assuming at least said third state, said memory including a plurality of spare good storage elements;

means for storing binary digits in good elements of said memory comprising means for placing said storage elements in the first or second of said three states, said first state corresponding to storage of the bit 1 and said second state corresponding to the storage of the bit 0; and means responsive to the indication produced by a storage element in its third state condition, when it is attempted to store a binary digit in said element, for storing said binary digit in one of said spare elements.

4. In combination:

a memory having a plurality of storage elements, some of which may be defective, the good ones of said elements being capable of assuming first, second and third states and the defective ones of said elements being capable of assuming at least said third state, said memory including a plurality of spare good storage elements;

means for storing binary digits in good elements of said memory comprising means for placing said storage elements in the first or second of said three states, said first state corresponding to storage of the bit 1 and said second state corresponding to the storage of the bit 0; and means responsive to the indication produced by a storage element in its third state, when it is attempted to read the binary digit stored in said element, for reading instead the binary digit stored in a particular one of said spare elements.

References Cited

UNITED STATES PATENTS

| | | | |
|---|---|---|---|
| 3,348,197 | 10/1967 | Akers et al. | 340—172.5 |
| 3,311,890 | 3/1967 | Waaben | 340—172.5 |
| 3,331,058 | 7/1967 | Perkins | 340—172.5 |
| 3,222,653 | 12/1965 | Rice | 340—172.5 |

GARETH D. SHAW, Primary Examiner